(No Model.) 2 Sheets—Sheet 1.

G. W. KIRKPATRICK.
GRAIN DRILL.

No. 486,343. Patented Nov. 15, 1892.

Witnesses
Raymond T. Barnes.
J. J. Elmore

Inventor
G. W. Kirkpatrick
By his Attorney
P. T. Dodge (No Model.) 2 Sheets—Sheet 2.

G. W. KIRKPATRICK.
GRAIN DRILL.

No. 486,343. Patented Nov. 15, 1892.

Witnesses
Raymond S. Barnes.
H. Elmer

Inventor
G. W. Kirkpatrick
By his Attorney
P. T. Dodge

UNITED STATES PATENT OFFICE.

GEORGE W. KIRKPATRICK, OF MACEDON, NEW YORK.

GRAIN-DRILL.

SPECIFICATION forming part of Letters Patent No. 486,343, dated November 15, 1892.

Application filed July 12, 1892. Serial No. 439,798. (No model.)

*To all whom it may concern:*

Be it known that I, GEORGE W. KIRKPATRICK, of Macedon, county of Wayne, and State of New York, have invented a new and useful Improvement in Grain-Drills, of which the following is a specification.

At the present day grain-drills are commonly provided with furrow-opening runners having tubular standards at the rear end, through which the seed is delivered into the furrow. In connection with these "runner-hoes," so called, it is customary to use a follower-wheel to press the earth down into the seed in the furrow. These wheels have heretofore been carried by means of two arms or of a forked arm straddling the tubular standard or boot of the hoe and extending rearwardly beyond the same, in order to carry the follower-wheel between the two arms, which swing upward and downward with the wheel, that it may rise and fall in relation to the runner. In practice it is found that these double or divided arms for carrying the wheel are open to various objections, one objection being the expense of constructing and fitting them; another, their excessive weight, and still another and more serious one, the fact that clods, stalks, and other obstructive matters are liable to be carried up by the wheel and wedged fast by its spokes between the carrying-arms, so as to prevent the revolution of the wheel. My invention is directed to an avoidance of these difficulties.

The object which I have in view is to so carry the wheel that it may be held securely in its upright position and directly in the path of the hoe, while being left entirely free or unobstructed on one side. To this end I make use of a single carrying-arm—that is, an arm which instead of being forked or divided is extended past one side only of the hoe and provided at the rear end with a single member, on the side of which the wheel is carried.

The essence of the invention lies in an arm adapted to sustain the wheel on one side, and the details may be variously constructed, although I recommend the peculiar construction represented in the accompanying drawings, which has in practice been found highly efficient.

Figure 1:
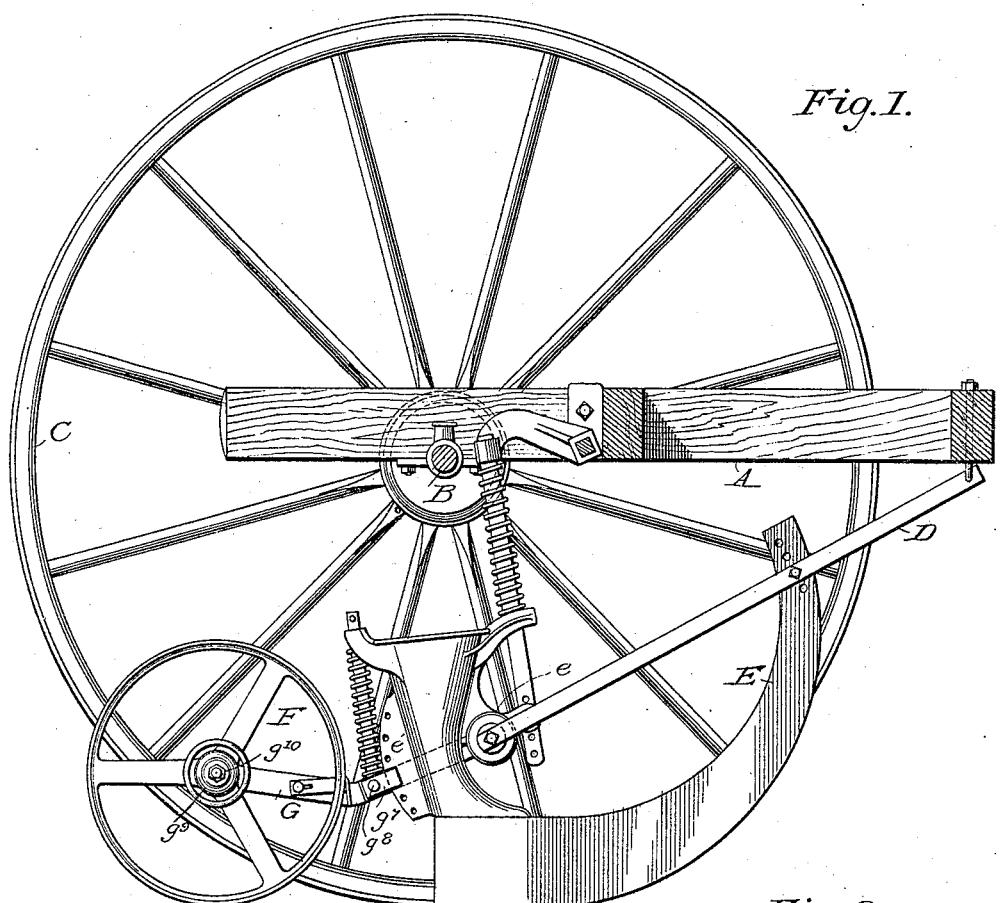
Figure 2:
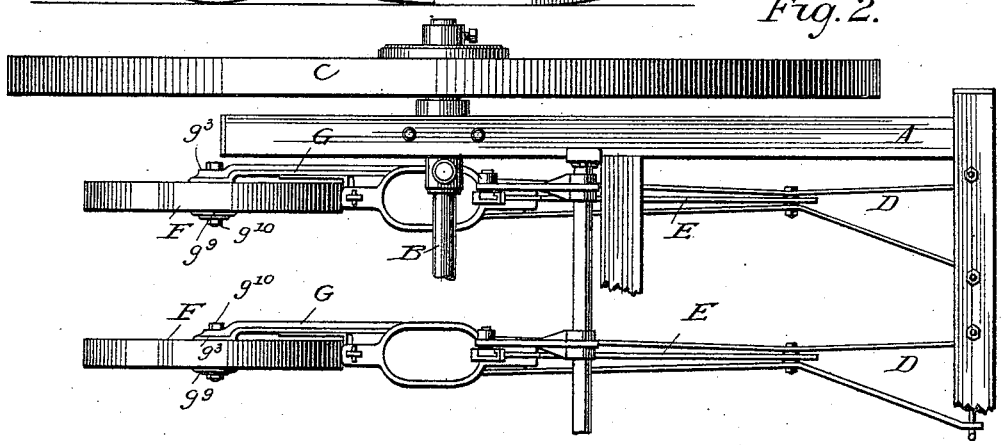
Figure 3:
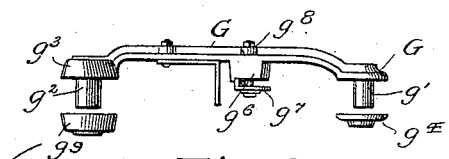
Figure 4:
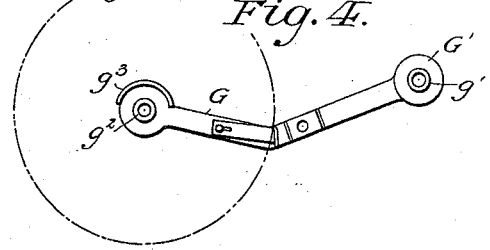
Figure 5:
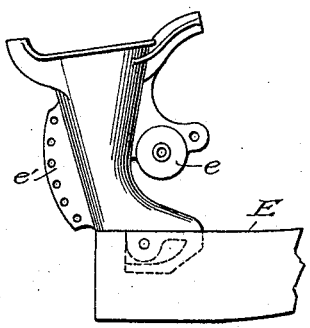
Figure 6:
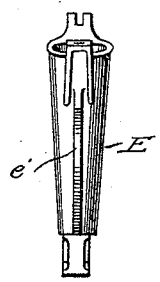
Figure 7:
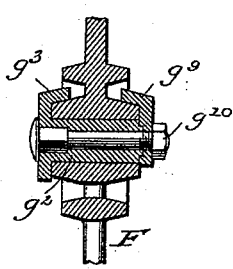

In the accompanying drawings, Figure 1 is a longitudinal section through the frame of a grain-drill provided with my improvement. Fig. 2 is a top plan view of the same, showing a hoe and its connection. Fig. 3 is a plan view of the wheel-carrying arm. Fig. 4 is a side view of the same. Fig. 5 is a side view of the hoe. Fig. 6 is a rear view of the same. Fig. 7 is a central cross-section through the wheel and the supporting-arm.

Referring to the drawings, A represents the main frame, carried by a transverse axle B, mounted at each end in a ground-wheel C.

D is one of the series of drag-bars, hinged at their forward ends to the frame, extending downward and rearward and attached to a runner-hoe E.

The foregoing parts may all be of substantially the ordinary construction and arrangement.

F represents the follower-wheel, and G the arm by which the wheel is carried. This arm is constructed, as shown in Figs. 3 and 4, with a wide circular bearing-face $G'$ at its forward end to fit against the side face of an ear $e$, cast on the front of the hoe, and is also provided with a journal $g'$ to extend through the ear. At its rear end the arm is formed with a tubular journal $g^2$, to extend through the hub of the follower-wheel, and with a flange $g^3$ to fit over one end of the hub and prevent falling dirt from passing into the wearing-surfaces. The journal at the forward end is thrust through the ear on the hoe, a bearing-plate $g^4$ applied to the opposite side of the ear, so as to interlock with the end of the journal $g'$, and a bolt passed through the several parts to draw them snugly together. This connection attaches the arm firmly to the hoe, while allowing the rear end to swing freely up and down. Midway of its length the arm has a projection $g^6$, which bears against one side of a vertical rib or lip $e'$, cast on the rear side of the hoe. A plate $g^7$, bearing against the opposite side of the lip or flange $e'$, is attached to the arm by a bolt $g^8$. The lip being thus embraced between the two surfaces serves to guide the arm in its vertical movement and to prevent lateral play or vibration. By tightening the bolt $g^8$ I am enabled to compensate for wear of the surfaces and to keep the parts at all times in close connection. The follower-wheel is slipped upon the rear journal $g^2$ of the arm and secured by a cap-plate $g^9$, secured by a through-bolt $g^{10}$, as shown in Fig. 7.

The arm constructed as above is, it will be seen, held strongly against lateral and torsional strain, so that although it gives support to the wheel on one side only the wheel is maintained securely in its upright position, so that it cannot under any circumstances cant or tip sidewise.

It will be observed that the wheel, being sustained as shown, is entirely exposed or uncovered on one side, thus rendering it impossible for obstructive matters to be lodged and held upon the arm thereby. I find in practice that the wheel carried in this manner possesses all the advantages which attend wheels supported on both sides, while at the same time it has many additional advantages.

Having thus described my invention, what I claim is—

1. In combination with a runner-hoe and a follower-wheel, a wheel-carrying arm lying wholly on one side of the hoe and wheel and jointed to the former, substantially as described.

2. In combination with a runner-hoe, an arm jointed thereto to swing vertically and a wheel applied wholly to one side of the arm and carried thereby.

3. In a grain-drill, the combination of a runner-hoe, a follower-wheel, and a single or undivided arm having at opposite ends laterally-projecting journals adapted to enter the wheel and the hoe, respectively.

4. In combination with a runner-hoe and a follower-wheel, a vertically-swinging wheel-carrying arm lying on one side of the hoe and wheel and engaging a vertical guide on the rear side of the hoe, whereby lateral play of the arm is prevented.

5. In combination with a runner-hoe, a follower-wheel, a wheel-carrying arm lying wholly on one side of the wheel, and an adjustable plate $g^7$, carried on the arm and engaging and sliding on the vertical rib or guide on the hoe.

In testimony whereof I have hereunto set my hand, this 7th day of April, 1892, in the presence of two attesting witnesses.

GEORGE W. KIRKPATRICK.

Witnesses:
FRED. C. JOHNSON,
CARL F. GATES.